United States Patent [19]

Hirose

[11] Patent Number: 4,582,236
[45] Date of Patent: Apr. 15, 1986

[54] APPARATUS FOR STITCHING WITH SYNTHETIC RESIN STAPLES OR TACKS

[76] Inventor: Tokuzo Hirose, 13-13, Higashiyamacho, Ashiya-shi, Hyogo-ken, Japan

[21] Appl. No.: 640,592

[22] Filed: Aug. 14, 1984

[30] Foreign Application Priority Data

Aug. 23, 1983 [JP] Japan ................. 58-154466

[51] Int. Cl.⁴ .......... B21J 15/08; B27F 7/04; B27F 7/19; D05B 23/00
[52] U.S. Cl. .................... 227/67; 227/152; 227/156
[58] Field of Search ............. 227/19, 67, 120, 152, 227/156

[56] References Cited

U.S. PATENT DOCUMENTS

| | | | |
|---|---|---|---|
| 480,031 | 8/1892 | Platt | 227/67 |
| 569,617 | 10/1896 | Crisp et al. | 227/67 |
| 2,054,994 | 9/1936 | Stainbrook | 227/67 |
| 2,935,434 | 5/1960 | Dawson | 227/156 X |
| 3,074,367 | 1/1963 | Habedank et al. | 112/228 |
| 3,116,487 | 1/1964 | Schick | 227/120 |
| 3,347,730 | 10/1967 | Keller et al. | 227/156 X |
| 4,039,078 | 8/1977 | Bone | 227/67 X |
| 4,262,836 | 4/1981 | Hirose | 227/156 X |
| 4,281,785 | 8/1981 | Brooks | 227/120 |
| 4,513,746 | 4/1985 | Aranyi et al. | 227/19 X |

Primary Examiner—Paul A. Bell
Assistant Examiner—Taylor J. Ross
Attorney, Agent, or Firm—Wenderoth, Lind & Ponack

[57] ABSTRACT

Stitching is achieved by means of a supply of synthetic resin staples or tacks contained in a staple feeder provided over work and arranged to be sequentially fed from the staple feeder legs of the staples or tacks penetrate through the work placed on a bed ends of the staples or tacks are deformed so as not to be removed from the work. Holes are formed, in advance, in the work at points through which the legs of the staples or tacks are to penetrate.

1 Claim, 16 Drawing Figures

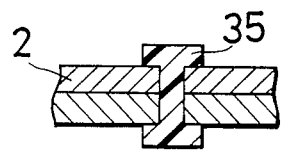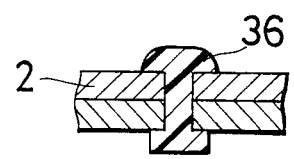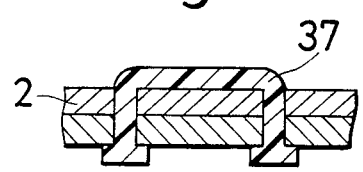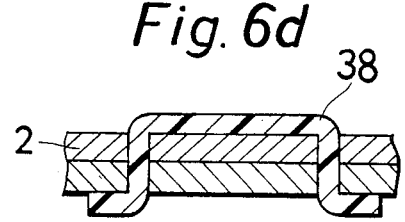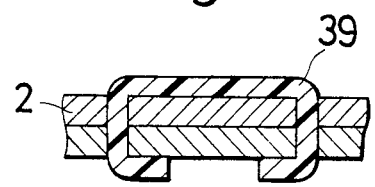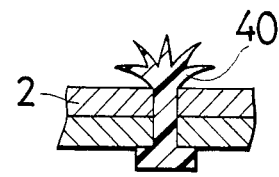

APPARATUS FOR STITCHING WITH SYNTHETIC RESIN STAPLES OR TACKS

BACKGROUND OF THE INVENTION

1. Field of the Invention

The present invention relates to an apparatus for stitching or sewing, with staples or tacks made of synthetic resins or of similar materials which, in effect, perform the function of a sewing thread, work in the form of a fabric, film, board, or netting, such as various kinds of textiles, plastics, leather, paper, etc.

2. Description of the Prior Art

A typical prior device is an industrial sewing machine wherein the formation of continuous seams is accomplished by entwining of a sewing thread or of two sewing threads, upper and lower. In this prior device, a vertically reciprocating needle sews the work stitch by stitch over a long distance. Therefore, a high degree of skill and attentiveness of an operator is required to ensure accomplishment of the formation of perfect seams. As, besides, the formation of seams is accomplished by employment of a thin and slim sewing needle, the work is frequently sewn up into a plurality of folded pieces, or the needle is broken or bent by a heavy load when the work is thick leather or hard plastics, thereby causing suspension of the operation or often impairing the seams.

SUMMARY OF THE INVENTION

Therefore, an object of the present invention is to provide an improved apparatus for sewing or connecting, whereby a work such as textiles, plastics, leather, paper, etc. can be readily and surely sewn up.

Another object of the invention is to provide an improved apparatus for sewing or connecting wherein a load to a sewing needle can be greatly reduced, and the sewing operation can be readily performed by anyone.

To accomplish the above objects, there is provided an apparatus for conducting a sewing method of preparing a supply of synthetic resin staples or tacks contained in a staple feeder provided over work and arranged to be sequentially fed from the staple feeder, penetrating sequentially legs of the synthetic resin staples or tacks through the work placed on a bed, deforming the legs of the staples or tacks so as not to be removed from the work, the penetrating step and deforming step being performed simultaneously at a plurality of points or successively from point to point, whereby seams or patterned seams adjacent to each other are formed to sew the work, comprising the step of forming, in advance, holes in the work at points through which the legs of the staples or tacks are to penetrate.

Furthermore, there is provided a sewing apparatus comprising a bed adapted to receive thereon work, a rigid arm fixedly positioned above the bed, an external cylinder integrally fitted at the end of the arm, an internal cylinder slip-fitted into the external cylinder along the axis of the external cylinder and having at a lower end thereof an outwardly extending work presser for pressing against the bed the work received thereon, a guide cylinder slip-fitted into the internal cylinder and having a lower end thereof sharpened, a staple feeder for housing a supply of synthetic resin staples or tacks arranged in a row and for applying a force to push out the staple or tacks into the guide cylinder, a staple driver, provided inside the guide cylinder and arranged to slide along the axis of the guide cylinder, for driving the staples or tacks downwardly, a recessed anvil fitted on the surface of the bed at a position aligned with the center line of the driver for pressing the legs of the staples.

Hence, in a sewing apparatus according to the invention, holes are formed in the work in advance at positions through which the ends of the synthetic resin staple or tacks penetrate, whereby the synthetic resin staple or tacks can readily penetrate the work such as thick leather or hard fabric, and will not be broken or bent, thus improving operating efficiency and attaining a smooth sewing operation.

BRIEF DESCRIPTION OF THE DRAWINGS

The features and advantages of the present invention will be apparent from the following description of the preferred embodiment taken in conjunction with the appended claims and the accompanying drawings wherein:

FIGS. 6a through 6f are cross sectional views showing variations of the synthetic resin staples or tacks according to the invention.

DETAILED DESCRIPTION OF THE PREFERRED EMBODIMENT

Figure 1:
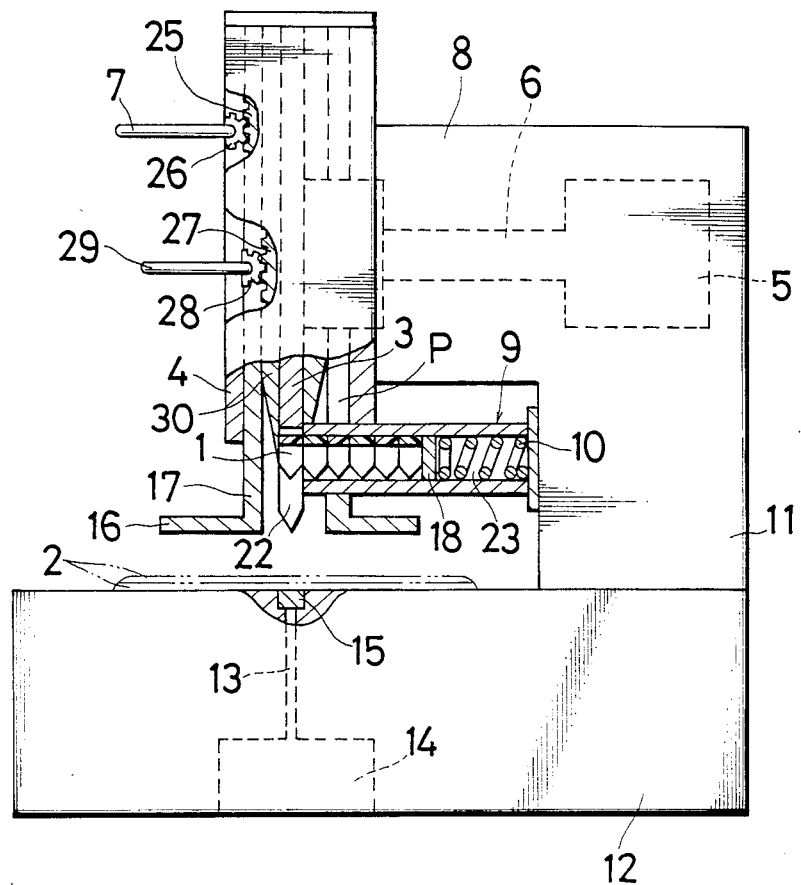
FIG. 1 is a side view, partially in section, of a sewing apparatus of an embodiment of the invention.
Figure 2:
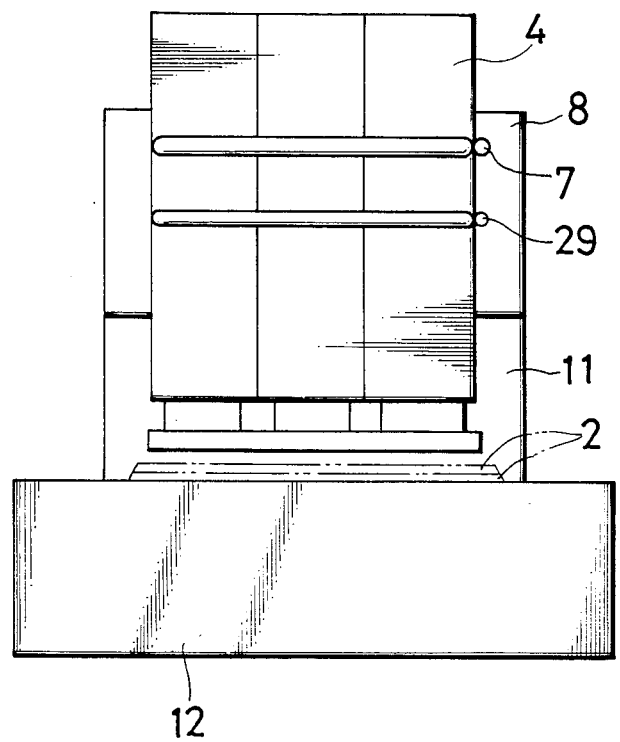
FIG. 2 is a front elevation of the sewing apparatus shown in FIG. 1.

FIG. 1 is a side elevation of a sewing apparatus 11 according to the present invention, and FIG. 2 is a front elevation thereof. The sewing apparatus 11 is fundamentally constituted by an arm 8 and a bed 12. A built-in driving unit 5 is contained as a power source in the sewing apparatus 11. At the end of the arm 8 is integrally fitted an external cylinder 4, and inside the external cylinder 4 is provided an internal cylinder 17. There is provided, inside the internal cylinder 17, a guide cylinder 30 which contains a staple driver 3. The staple driver 3 is arranged to slide along the axis of the guide cylinder 30 in response to a power transmission device 6, which is driven by the driving unit 5. The staple driver 3 is capable of reciprocating toward and away from the bed 12, which motion can be effectuated by the cooperation of the driving unit 5 and the power transmission device 6.

Figure 3:
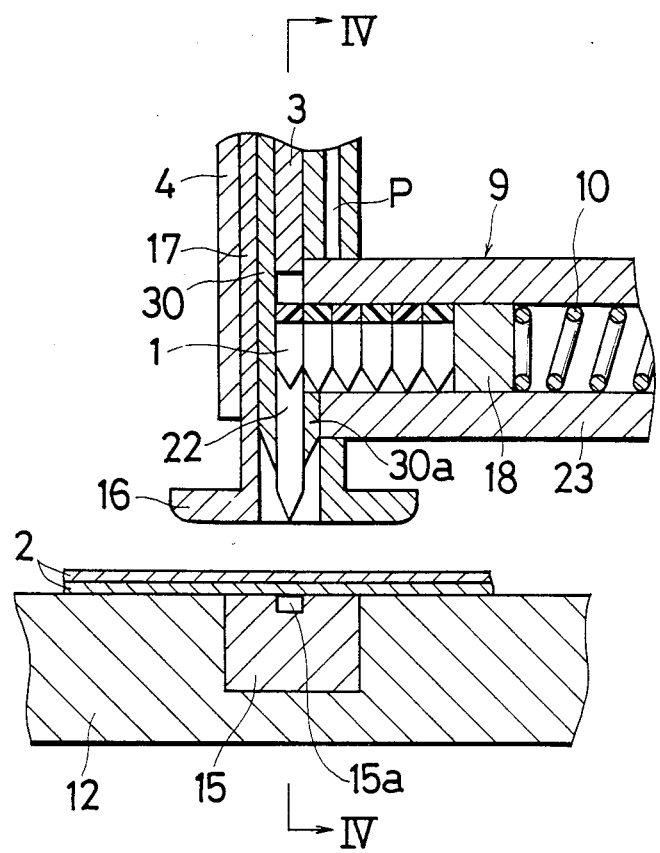
FIG. 3 is an enlarged cross sectional side view showing an end of an arm and the vicinity thereof of apparatus of the invention.
Figure 4:
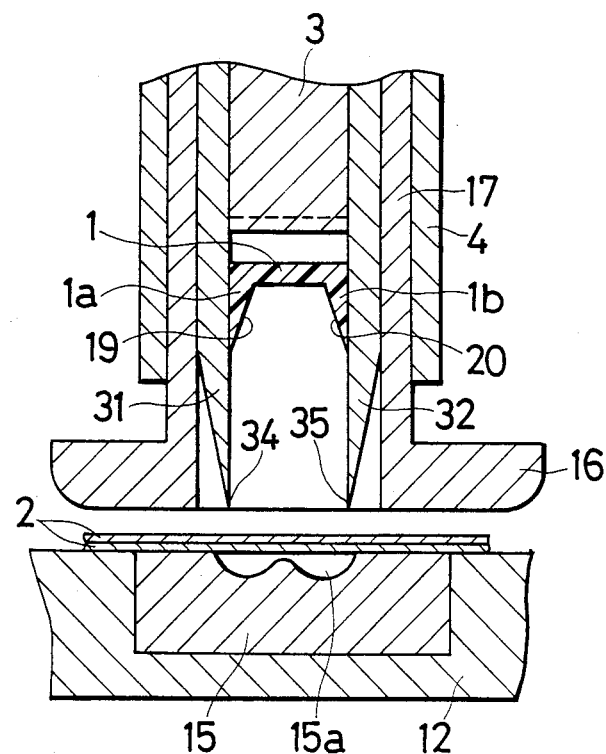
FIG. 4 is an enlarged section taken along the line IV—IV of FIG. 3.

FIG. 3 is an enlarged cross sectional side view of the end of the arm 8 and the vicinity thereof, and FIG. 4 is a cross sectional view taken along the line IV—IV in FIG. 3. The internal cylinder 17 can be slip-fitted into the external cylinder 4, which is fitted at the end of the arm 8, along the axis of the external cylinder 4. A work presser 16 is provided at the lower end, directed toward the bed 12, of the internal cylinder 17 and is in the shape of a flange extending outward therefrom. This work presser 16 is, as the internal cylinder 17 is lowered onto the bed 12, capable of holding down a work or workpiece 2 placed on the bed 12. There is provided, in the internal cylinder 17, the guide cylinder 30. The lower end 30a, directed toward the bed 12, of the guide cylinder 30 is so formed as to be approximately in the shape of an inverted U in its longitudinal section. The lower end 30a is formed with a pair of metal legs 31 and 32 with the ends 34 and 35 thereof sharpened. As the guide cylinder 30 is lowered onto the bed 12, the legs 31 and 32 penetrate into the work 2 placed on the bed 12.

At the lower part of the internal cylinder 17, there is cut out a hole "P" whereinto is fitted a staple feeder 9. The staple feeder 9 consists of a tubular body 23 wherein are stored a number of synthetic resin staples 1 arranged in a row and a spring 10 inside the body 23 and which, through the medium of a pushing piece 18, always applies a force to push out a staple 1 into the internal cylinder 17 whereby there is always provided a staple 1 in the guide cylinder 30.

On the surface of the bed 12, where the center line of the staple driver 3 provided in the guide cylinder 30 crosses the bed 12, there is fitted an anvil 15 which has a die hollow 15a which faces the lower end of a staple passage 22 of the guide cylinder 30. The die hollow 15a is, as will be seen from FIG. 4, so formed as to be approximately in the shape of the letter of W in longitudinal section. The anvil 15 is heated, at appropriate instances, by heating devices 13 and 14.

With reference to FIG. 1, on the outer wall of the internal cylinder 17, there is formed a rack 25 extending along the axis of the cylinder. A pinion 26, which is engaged with the rack 25, is pivotally supported on the external cylinder 4, and is rotated by the swing action of a lever 7. By the rotation of the pinion 26, the internal cylinder 17, with the rack 25 engaging the pinion 26, can move down and, thus alternately approaching the bed 12 and parting therefrom. Likewise, on the outer wall of the guide cylinder 30 in the internal cylinder 17, there is formed a rack 27 extending along the axis of the guide cylinder 30. A pinion 28, which is engaged with the rack 27, is pivotally supported on the internal cylinder 17, and is rotated by the swing action of a lever 29. By the rotation of the pinion 28, the guide cylinder 30, with the rack 27 engaging the pinion 28, can move up and down, thus alternately approaching the bed 12 and parting therefrom.

In the following, a detailed description will be given, with reference to FIGS. 5a through 5f, of the processes of operation of the equipment of an embodiment of the invention.

Figure 5A:
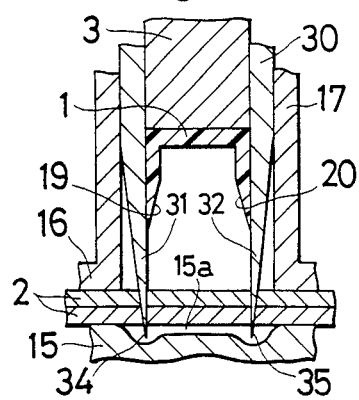
FIGS. 5a through 5f are enlarged cross-sectional views showing the processes of the deformation of the synthetic resin staple according to the invention.

As the first step of operation, the work 2 is placed on the bed 12. Then the internal cylinder 17, inside the external cylinder 4, is caused to slide down by the action of the lever 7, and the work 2 is held down by the work presser 16. Subsequently, as illustrated in FIG. 5a, by the action of the lever 29, the guide cylinder 30, inside the internal cylinder 17, is caused to slide down, and the ends 34 and 35 of the legs 31 and 32 penetrate the work 2 on the bed 12.

Figure 5B:
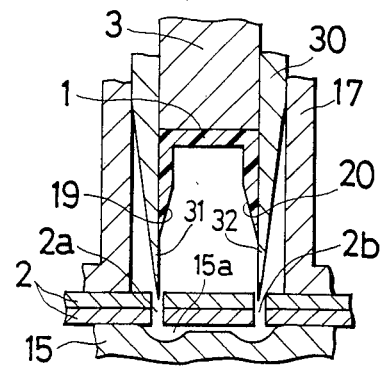

As the second step of operation, the guide cylinder 30 is caused to slide up by the action of the lever 29, and the ends 34 and 35 are moved upwardly to be restored to the initial positions thereof. As a result, there are formed holes 2a and 2b in the work 2 as illustrated in FIG. 5b.

Figure 5C:
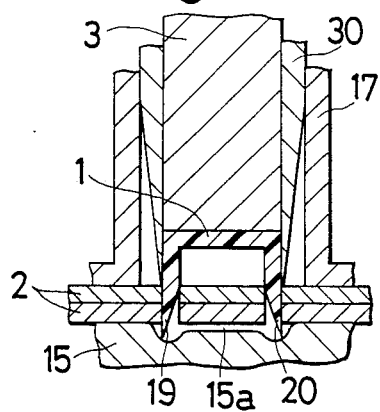
Figure 5D:
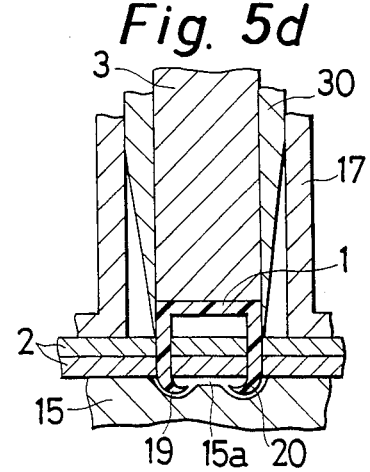

As the third step of operation, the synthetic resin staple 1, which has been supplied from the staple feeder 9 into the staple passage 22 of the guide cylinder 30, is lowered and pushed toward the work 2 by the staple driver 3 enclosed in the guide cylinder 30, so that the ends 19 and 20 of the synthetic resin staple 1 penetrate through the holes 2a and 2b, as illustrated in FIG. 5c. The ends 19 and 20 are pressed onto the anvil 15 on the surface of the bed 12 by the staple driver 3. Consequently, the ends 19 and 20 of the synthetic resin staple 1 are respectively bent inwardly, sliding over the curved inside surface of the die hollow 15a of the anvil 15, as illustrated in FIG. 5d.

Figure 5E:
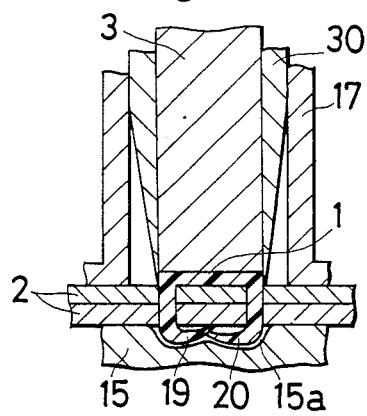

As the fourth step of operation, the two ends 19 and 20 overlap each other in the die hollow 15a as shown in FIG. 5e, and are subjected to further pressure by the staple driver 3. Subsequently the ends 19 and 20 of the synthetic resin staple 1 are heated, by the heating devices 13 and 14 provided under the central part of the die hollow 15a of the anvil 15, the heating devices being so contrived as to apply heat at appropriate moments. Finally the synthetic resin staple 1 is formed into a seam in the shape of a loop, as illustrated in FIG. 5f.

Figure 5F:
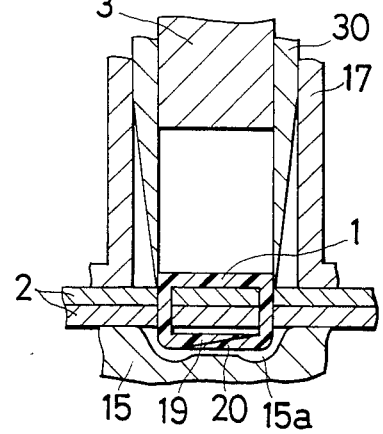

The aforesaid process takes place successively at one point after another or simultaneously at many points, forming one or a plurality of the loop-like seams, as shown in FIG. 5f, at such points, and thus the work 2 is sewn. The expression "simultaneously at many points" as used hereinbefore is to be construed as including such cases as:

(1) where a number of seams are formed at the same time and such seams are adjacent to each other and formed into a single, continuous line, thereby sewing the work together, and (2) where there is formed on the head of the synthetic resin staple 1 a pattern which can be used for the purpose of embroidery work, and such patterns are applied at a plurality of predetermined points at the same time. One or a plurality of sewing units 11 are arranged in a curved line, in a straight line, or are so disposed as to form an assembly of points, and the work is sewn simultaneously at each point or successively from point to point. The staple 1 made of a synthetic resin or of a similar material has the ends thereof deformed, and thus performs the function of a sewing thread used in a conventional sewing machine. When, for instance, the material is a synthetic resin, it is possible to color the staple. Furthermore, as for the shape of the synthetic resin staple 1, it is also possible to use, besides a staple in the shape of an inverted U as described above, a staple in the shape of a nail, pin, rivet (flat- or convex-headed, or with other types of heads), etc., as illustrated in FIGS. 6a to 6f.

In FIGS. 6a and 6b, there are shown cases where synthetic a resin tack 35 or 36, which originally is provided with a sharp point at the end of its shank, has penetrated the work 2 and such point has been deformed by heating and pressing, thereby forming a seam in the shape of, so to speak, a rivet. In FIGS. 6c, 6d and 6e are shown cases where a synthetic resin staple 37, 38, or 39, in the shape of an inverted U, has penetrated the work and the ends thereof have been deformed by heating and pressing so as to form a seam, the processed and deformed ends of the staple being apart from each other in all these instances. In FIG. 6f, a synthetic resin tack 40 is formed into a rivet for the purpose of an embroidery work. The changes of structures of or configurations of the anvil 15, the guide cylinder 30, and the staple driver 3 enable the varied formations of the synthetic resin staple in the aforementioned shapes of a nail, pin, rivet, etc., as shown in FIGS. 6a to 6f.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A sewing apparatus for stitching a thick work such as leather or hard plastic, said apparatus comprising:
 a bed adapted to receive thereon work;
 a rigid arm fixedly positioned above the bed;
 an external cylinder integrally fitted at an end of the arm;
 an internal cylinder slip-fitted into the external cylinder along the axis of the external cylinder and having at a lower end thereof outwardly extending work presser means for pressing against the bed the work received thereon;
 means, operatively connected between said external and internal cylinders, for selectively vertically moving said internal cylinder with respect to said external cylinder between an upper position whereat said work presser means is spaced from said bed and a lower position whereat said work presser means presses work against said bed, said internal cylinder moving means comprising a first rack on an outer wall of said internal cylinder, a first pinion engaged with said first rack and pivotally supported on said external cylinder, and a first lever for rotating said first pinion and thereby moving vertically said first rack and said internal cylinder;
 a guide cylinder slip-fitted into the internal cylinder and having a lower end defined by two laterally spaced downwardly extending members having respective outer surfaces bevelled to define sharpened ends, said guide cylinder having therein a vertical passage extending between said sharpened ends;
 means, operatively connected between said internal cylinder and said guide cylinder, for selectively vertically moving said guide cylinder with respect to said internal cylinder between a lower position whereat said sharpened ends pierce the work to form openings therein and an upper position raising said sharpened ends above the thus pierced work, said guide cylinder moving means comprising a second rack on an outer wall of said guide cylinder, a second pinion engaged with said second rack and pivotally supported on said internal cylinder, and a second lever for rotating said second pinion and thereby for moving vertically said second rack and said guide cylinder; p1 staple feeder means for housing a supply of synthetic resin staples arranged in a row and for feeding the staples sequentially through said external, internal and guide cylinders into said vertical passages;
 staple driver means, provided inside said vertical passage and arranged to slide along the axis of the guide cylinder;
 driving means, mounted in said rigid arm and operatively connected to said staple driver means, for moving said staple driver means downwardly within said vertical passage and thereby for driving downwardly an endmost staple positioned in said vertical passage and inserting legs of the staple through openings formed previously by said sharpened ends of said guide cylinder; and
 recessed anvil means, formed in a surface of the bed aligned with said staple drive means, for pressing and deforming the ends of the staples.

* * * * *